(12) United States Patent
Alm et al.

(10) Patent No.: US 12,465,980 B2
(45) Date of Patent: Nov. 11, 2025

(54) COATED CUTTING TOOL

(71) Applicant: SECO TOOLS AB, Fagersta (SE)

(72) Inventors: Oscar Alm, Fagersta (SE); Hindrik Engstrom, Fagersta (SE); Tommy Larsson, Fagersta (SE); Jonas Lauridsen, Fagersta (SE); Malin Rydert, Fagersta (SE)

(73) Assignee: Seco Tools AB, Fagersta (SE)

( * ) Notice: Subject to any disclaimer, the term of this patent is extended or adjusted under 35 U.S.C. 154(b) by 792 days.

(21) Appl. No.: 17/638,389

(22) PCT Filed: Aug. 28, 2020

(86) PCT No.: PCT/EP2020/074112
§ 371 (c)(1),
(2) Date: Feb. 25, 2022

(87) PCT Pub. No.: WO2021/038060
PCT Pub. Date: Mar. 4, 2021

(65) Prior Publication Data
US 2022/0288697 A1   Sep. 15, 2022

(30) Foreign Application Priority Data

Aug. 30, 2019   (EP) .................................. 19194801

(51) Int. Cl.
*B23B 27/14* (2006.01)
*B23B 1/00* (2006.01)

(52) U.S. Cl.
CPC .............. *B23B 27/148* (2013.01); *B23B 1/00* (2013.01); *B23B 2228/105* (2013.01)

(58) Field of Classification Search
None
See application file for complete search history.

(56) References Cited

U.S. PATENT DOCUMENTS

2002/0146292 A1* 10/2002 Shimizu ................ B23B 27/145
407/113
2006/0222885 A1   10/2006 Fukano et al.
(Continued)

FOREIGN PATENT DOCUMENTS

CN    1570202 A    1/2005
CN    109312474 A   2/2019
(Continued)

*Primary Examiner* — Seth Dumbris
(74) *Attorney, Agent, or Firm* — Corinne R. Gorski

(57) ABSTRACT

A coated cutting tool includes a rake face, a flank face, and a cutting edge region between and adjoining the flank face and the rake face in a nose area of a cutting tool insert. The cutting edge region is intersected by an edge line and defines a cutting edge sector that defines an cutting edge radius, $r_e$. The coated cutting tool includes a substrate with a coating having a thickness between 1 μm and 40 μm, where the coating includes an $\alpha$-$Al_2O_3$ layer and an MTCVD TiCN layer located between the substrate and the $\alpha$-$Al_2O_3$ layer. The $\alpha$-$Al_2O_3$ layer exhibits a texture coefficient TC(hkl), as measured by X-ray diffraction using CuKa radiation and θ-2θ scan, defined according to Harris formula $$TC(hkl) = \frac{I(hkl)}{I_0(hkl)}\left[\frac{1}{n}\sum_{n=1}^{n}\frac{I(hkl)}{I_0(hkl)}\right]^{-1}$$

where I(hkl) is the measured integrated area intensity of the (hkl) reflection with corresponding reference intensity $I_0$(hkl), and n is the number of reflections used in the calculation.

12 Claims, 5 Drawing Sheets

(56) References Cited

U.S. PATENT DOCUMENTS

| | | | |
|---|---|---|---|
| 2007/0218313 A1 | 9/2007 | Okada et al. | |
| 2008/0057280 A1* | 3/2008 | Watanabe | C23C 16/36 427/255.28 |
| 2008/0160338 A1* | 7/2008 | Tanibuchi | C23C 16/36 428/411.1 |
| 2014/0173996 A1* | 6/2014 | Stiens | B24D 3/34 51/309 |
| 2016/0175940 A1* | 6/2016 | Lindahl | C23C 28/048 428/141 |
| 2018/0236564 A1* | 8/2018 | Kawahara | B23C 5/20 |
| 2020/0361002 A1* | 11/2020 | Ono | C23C 16/45555 |

FOREIGN PATENT DOCUMENTS

| | | | |
|---|---|---|---|
| EP | 3034653 A1 | 6/2016 | |
| JP | H0762542 A | 3/1995 | |
| JP | 2006305714 A | 11/2006 | |
| JP | 2011101910 A | 5/2011 | |
| WO | WO-2018184887 A1 * | 10/2018 | B23B 27/148 |

* cited by examiner

COATED CUTTING TOOL

RELATED APPLICATION DATA

This application is a § 371 National Stage Application of PCT International Application No. PCT/EP2020/074112 filed Aug. 28, 2020 claiming priority to EP 19194801.7 filed Aug. 30, 2019.

TECHNICAL FIELD

The present invention relates to a coated cutting tool comprising a substrate with a coating, where the coating comprises at least one textured α-Al$_2$O$_3$ layer and a textured MTCVD TiCN layer located between the substrate and the α-Al$_2$O$_3$ layer. The present invention also relates to a method of manufacturing the coated cutting tool and use of the coated cutting tool.

BACKGROUND

For superior machining performance in turning of steel materials, a (001) textured α-Al$_2$O$_3$CVD coating have been state of the art for more than 10 years. It is the (001) textured α-Al$_2$O$_3$ CVD coatings ability to withstand crater wear better than other coatings that is the decisive property for superior turning performance. During the last decade of development, the CVD α-Al$_2$O$_3$ coatings have focused on controlling and optimizing the (001) texture to a higher degree than earlier.

One drawback with higher (001) textured CVD α-Al$_2$O$_3$ coatings is their higher tendency for flaking on the flank face as the insert is plastically deformed during the machining operation. Less textured CVD α-Al$_2$O$_3$ coatings have less pronounced flaking on the flank face when the insert is plastically deformed.

If high crater wear resistance, i.e. a high textured (001) α-Al$_2$O$_3$CVD coating, have been desired the sensitivity for plastic deformation have had to be accepted. Otherwise a compromise between crater wear resistance and resistance for plastic deformation, resulting in a less (001) textured α-Al$_2$O$_3$CVD coating, have to be chosen.

Today's industry continuously seeks solutions for economic and high productivity manufacturing. Within the metal cutting tool industry, a major part of this effort is focused on improving the wear behaviour of the cutting tools by designing the properties of the coating material used in the application. It is therefore a need for coated cutting tools having improved wear resistance and resistance for plastic deformation.

It is an object of the invention to provide a coated cutting tool insert with improved performance in cutting operations. It is another object of the invention to provide a coated cutting tool with improved wear resistance, such as high crater wear resistance and resistance for plastic deformation.

SUMMARY

According to a first aspect, the above objects are achieved by a coated cutting tool according to claim 1. According to one embodiment there is provided a coated cutting tool having a rake face and a flank face, and a cutting edge region between and adjoining the flank face and the rake face in a nose area of the cutting tool insert, the cutting edge region being intersected by an edge line and defines a cutting edge sector that defines an cutting edge radius, $r_e$, the coated cutting tool comprising a substrate with a coating having a thickness between 1 μm and 40 μm, where the coating comprises an α-Al$_2$O$_3$ layer and an MTCVD TiCN layer located between the substrate and the α-Al$_2$O$_3$ layer, wherein the α-Al$_2$O$_3$ layer exhibits a texture coefficient TC(hkl), as measured by X-ray diffraction using CuKa radiation and θ-2θ scan, defined according to Harris formula $$TC(hkl) = \frac{I(hkl)}{I_0(hkl)} \left[ \frac{1}{n} \sum_{n=1}^{n} \frac{I(hkl)}{I_0(hkl)} \right]^{-1}$$

where I(hkl) is the measured integrated area intensity of the (hkl) reflection with corresponding reference intensity I$_0$(hkl), n is the number of reflections used in the calculation, the (hkl) reflections used are (1 0 4), (1 1 0), (1 1 3), (0 2 4), (1 1 6), (0 1 8), (3 0 0), (0 2 10), (0 0 12) and (0 1 14) and their corresponding reference intensities used are I$_0$(1 0 4)=10000, I$_0$(1 1 0)=4686, I$_0$(1 1 3)=9734, I$_0$(0 2 4)=4903, I$_0$(1 1 6)=9562, I$_0$(0 1 8)=724, I$_0$(3 0 0)=5632, I$_0$(0 2 10)=728, I$_0$(0 0 12)=168 and I$_0$(0 1 14)=448, wherein the surface roughness of the substrate on the flank face is R$_a$≥0.24 μm, as measured from a SEM image taken from a cross section in an area S$_f$ of 1.1×1.1 mm$^2$ at the nose of the flank face, where said area S$_f$ begins at a distance about 0.4 mm from the cutting edge region, the surface roughness of the substrate on the rake face is 0.05 μm<R$_a$<18 μm, as measured from a SEM image taken from a cross section in an area S$_r$, of 1.1×1.1 mm$^2$ at the nose of the rake face, where said area S$_r$ begins at a distance about 0.4 mm from the cutting edge region, the MTCVD TiCN layer exhibits a texture coefficient TC(hkl), as measured by X-ray diffraction using CuKa radiation and θ-2θ scan, defined according to Harris formula where I(hkl) is the measured integrated area intensity of the (hkl) reflection with corresponding reference intensity I$_0$(hkl), n is the number of reflections used in the calculation, the (hkl) reflections used are (1 1 1), (2 0 0), (2 2 0), (3 1 1), (3 3 1), (4 2 0), (4 2 2) and (5 1 1), and their corresponding reference intensities used are: I$_0$(1 1 1)=7871, I$_0$(2 0 0)=10000, I$_0$(2 2 0)=5369, I$_0$(3 1 1)=2550, I$_0$(3 3 1)=1128, I$_0$(4 2 0)=2366, I$_0$(4 2 2)=2479, and I$_0$(5 1 1)=1427, wherein TC(4 2 2) is ≥5.5 on the rake face as measured in area S$_r$, and that the α-Al$_2$O$_3$ layer exhibits a texture coefficient TC(0 0 12)≥8.5 on the rake face as measured in area S$_r$. Thanks to the combination of the difference in surface roughness on the rake face and the flank face and the high textures of the MTCVD TiCN-layer and the MTCVD α-Al$_2$O$_3$-layer a combination of high crater wear and flaking resistance is achieved.

According to one embodiment the coated cutting tool according to any of the preceding claims, wherein the MTCVD TiCN layer on the rake exhibits a TC(4 2 2)≥6.0, preferably ≥7.0.

According to one embodiment the MTCVD TiCN layer on the flank face exhibits a TC(4 2 2)≤3.5

According to one embodiment the MTCVD TiCN layer on the flank face exhibits a TC(4 2 2)≤3.0. Therewith an even better resistance to flaking of alumina is achieved.

According to one embodiment TC(422) of the MTCVD TiCN layer on the rake face is at least two times TC(4 2 2) of the MTCVD TiCN layer on the flank face.

According to one embodiment the α-Al$_2$O$_3$ layer exhibits a texture coefficient TC(0 0 12)≥9, most preferably ≥9.5 on the rake face. Due to the very high texture of the α-Al$_2$O$_3$-layer a high crater wear resistance is achieved.

According to one embodiment the thickness of the α-Al$_2$O$_3$ layer is 1.5-20 μm, preferably 2.5-15 μm, most preferably 5-10 μm.

According to one embodiment the thickness of said MTCVD TiCN layer is 1.5-20 μm, preferably 2.5-15 μm, most preferably 5-10 μm.

According to one embodiment the surface roughness, R$_a$, of the substrate in area S$_r$ on the rake face is 0.05 μm<R$_a$<0.15 μm.

According to one embodiment the surface roughness, R$_a$, of the substrate in area S$_r$ on the rake face is less than 70% of the surface roughness, R$_a$, of the substrate in area S$_r$ on the flank face.

According to one embodiment the substrate is cemented carbide, cermet, ceramic.

According to one embodiment the average grain size of the TiCN layer as measured on the rake face is between 0.3 and 0.5 μm as measured with the average grain intercept method at 80% of the layer thickness as seen in a direction from the substrate towards the outer surface of the coating.

According to a second aspect the present invention provides a method of manufacturing a cutting tool insert characterized in
- sintering a green body of cemented carbide into a substrate comprising a rake face and a flank face,
- polishing at least area S on the rake face of the substrate to a surface roughness of 0.05 μm<R$_a$<0.18 μm as measure with profilometer,
- depositing a TiCN layer by medium temperature chemical vapour deposition at a temperature between 830° C. and 900° C. in a gas mixture comprising TiCl$_4$, CH$_3$CN and H$_2$,
- depositing the textured α-Al$_2$O$_3$-layer by chemical vapour deposition at a temperature between 950° C. and 1050° C. in a gas mixture comprising: H$_2$S, CO$_2$, HCl and AlCl$_3$ and H$_2$ at a gas pressure between 50 and 150 mbar.

According to a third aspect the invention provides use of cutting tool inserts according to any of the above described embodiments for machining by turning.

DEFINITIONS AND METHODS

Coating Deposition

Figure 1:
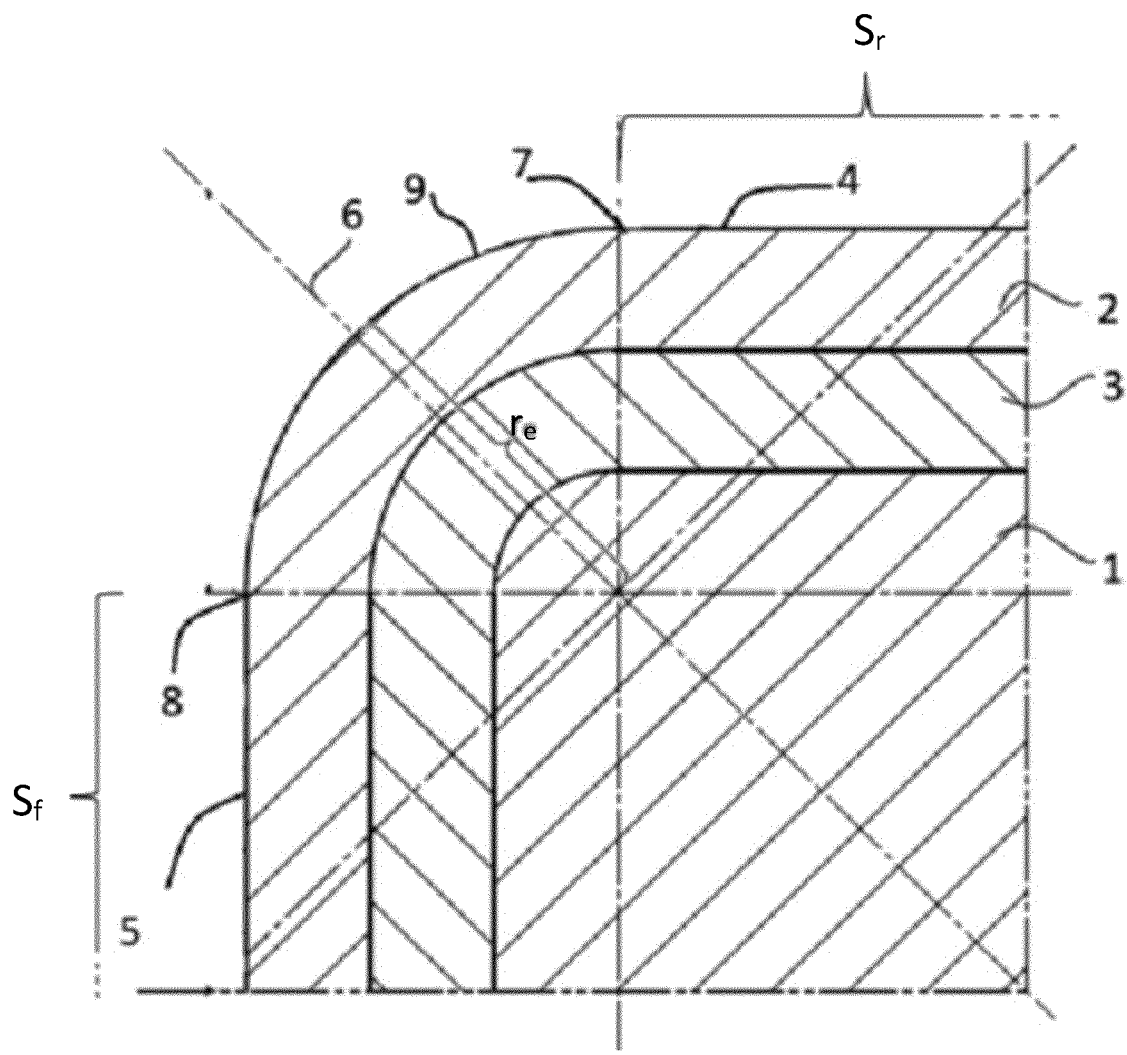
FIG. 1 is a cross-section through a part of a coated cutting tool insert according to an embodiment of the invention.

The coatings in the examples below were deposited in a radial Ionbond Bernex model BPXpro 530 L tandem CVD equipment capable of housing 10000 half-inch size cutting inserts.

X-Ray Diffraction Measurement

Texture coefficient values, TC(hkl), were measured using XRD with CuKα radiation on both flank and rake faces on coated cutting tools by using a Bruker D8 Advance diffractometer, running a Cu tube at 40 kV and 40 mA, equipped with a LynxEye XE-T detector, operating in θ-2θ mode. The diffractometer was equipped with fixed beam optics: on the primary side a 2.3° Soller slit and a 0.6 mm divergence slit, on the secondary side an anti-scatter slit of 8 mm, followed by a 2.5° Soller slit and a 0.5 mm Ni filter. Diffraction patterns were recorded in the range 18° to 143° in steps of 0.05° in 2θ for a total measurement time of about 5 min. The coated cutting tools were mounted in sample holders to ensure that the measured sample surface was parallel to the reference surface of the sample holder, and also at the appropriate height.

The data analysis was made using whole-pattern fitting with the Le Bail method using the Bruker TOPAS 5 program. The output i.e. integrated peak areas for the profile fitted curve, from this program were, after corrections described below, then used to calculate the texture coefficients of the layers by comparing the ratio of the measured intensity data to reference intensities for the layers of TiCN and α-Al$_2$O$_3$ using the Harris formula (1) as disclosed above.

Measured intensities were thin film corrected due to differences in relative intensities of peaks scattered by the layers at different 2θ angles are different compared to for bulk samples, due to the differences in path length through the layer(s). Therefore, thin film correction was applied to the extracted integrated peak area intensities for the profile fitted curve, taken into account also the linear absorption coefficient of layer(s), when calculating the TC values. Since possible further layers above, for example, the α-Al$_2$O$_3$ layer will affect the X-ray intensities entering the α-Al$_2$O$_3$ layer and exiting the whole coating, corrections need to be made for these as well, taken into account the linear absorption coefficient for the respective compound in a layer. The same applies for X-ray diffraction measurements of a TiCN layer if the TiCN layer is located below, for example, an α-Al$_2$O$_3$ layer. Alternatively, a further layer, such as TiN, above an alumina layer can be removed by a method that does not substantially influence the XRD measurement results, e.g. chemical etching.

In order to investigate the texture of the α-Al$_2$O$_3$ layer X-ray diffraction was conducted using CuKα radiation and texture coefficients TC (hkl) for different growth directions of the grains of the α-Al$_2$O$_3$ layer were calculated according to the Harris formula (1) as disclosed above, where I(hkl) equals the measured integrated area intensity of the (hkl) reflection with corresponding reference intensity I$_0$(hkl). In this case the (hkl) reflections and their corresponding reference intensities used were: I$_0$(1 0 4)=10000, I$_0$(1 1 0)=4686, I$_0$(1 1 3)=9734, I$_0$(0 2 4)=4903, I$_0$(1 1 6)=9562, I$_0$(0 1 8)=724, I$_0$(3 0 0)=5632, I$_0$(0 2 10)=728, I$_0$(0 0 12)=168 and I$_0$(0 1 14)=448. The measured integrated peak area is thin film corrected and corrected for any further layers above (i.e. on top of) the α-Al$_2$O$_3$ layer before said ratio is calculated.

The texture coefficients TC (hkl) for different growth directions of the columnar grains of the TiCN layer were calculated according to the Harris formula (1) as disclosed above, where I(hkl) equals the measured integrated area intensity of the (hkl) reflection with corresponding reference intensity I$_0$(hkl). In this case the (hkl) reflections and their corresponding reference intensities used were: I$_0$(1 1 1)=7871, I$_0$(2 0 0)=10000, I$_0$(2 2 0)=5369, I$_0$(3 1 1)=2550, I$_0$(3 3 1)=1128, I$_0$(4 2 0)=2366, I$_0$(4 2 2)=2479, and I$_0$(5 1

1)=1427. The reflexes (5 1 1) and (3 3 3) are completely overlapped and the intensity of the (5 1 1) peak was therefore calculated from the sum of the intensities for (5 1 1) and (3 3 3), which is the measured one. This correction was performed as follows. I(5 1 1) was set to the sum of integrated peak areas for (5 1 1) and (3 3 3), followed by a subtraction of a calculated value for the (3 3 3) reflex, $I_c(3\ 3\ 3)$, using the relation of the reference intensities of intensities for the (1 1 1) and (3 3 3) reflexes: $I_c(3\ 3\ 3)=I(1\ 1\ 1)*I_0(3\ 3\ 3)/I_0(1\ 1\ 1)$. The value used for $I_0(3\ 3\ 3)=476$. The measured integrated peak area is thin film corrected and corrected for any further layers above, for example the $\alpha$-$Al_2O_3$ layer, before said ratio is calculated.

It is to be noted that peak overlap is a phenomenon that can occur in X-ray diffraction analysis of coatings comprising for example several crystalline layers and/or that are deposited on a substrate comprising crystalline phases, and this has to be considered and compensated for by the skilled person conducting the analysis. A peak overlap of peaks from the $\alpha$-$Al_2O_3$ layer with peaks from the TiCN layer might influence measurement and needs to be considered. It is also to be noted that for example WC in the substrate can have diffraction peaks close to the relevant peaks of the present coating.

Surface Roughness Measurement from SEM Images

A surface roughness value for an interface between a substrate and a coating can be evaluated from SEM images taken from polished or fractured cross-sections. The method used here was performed as follows.

Figure 4:
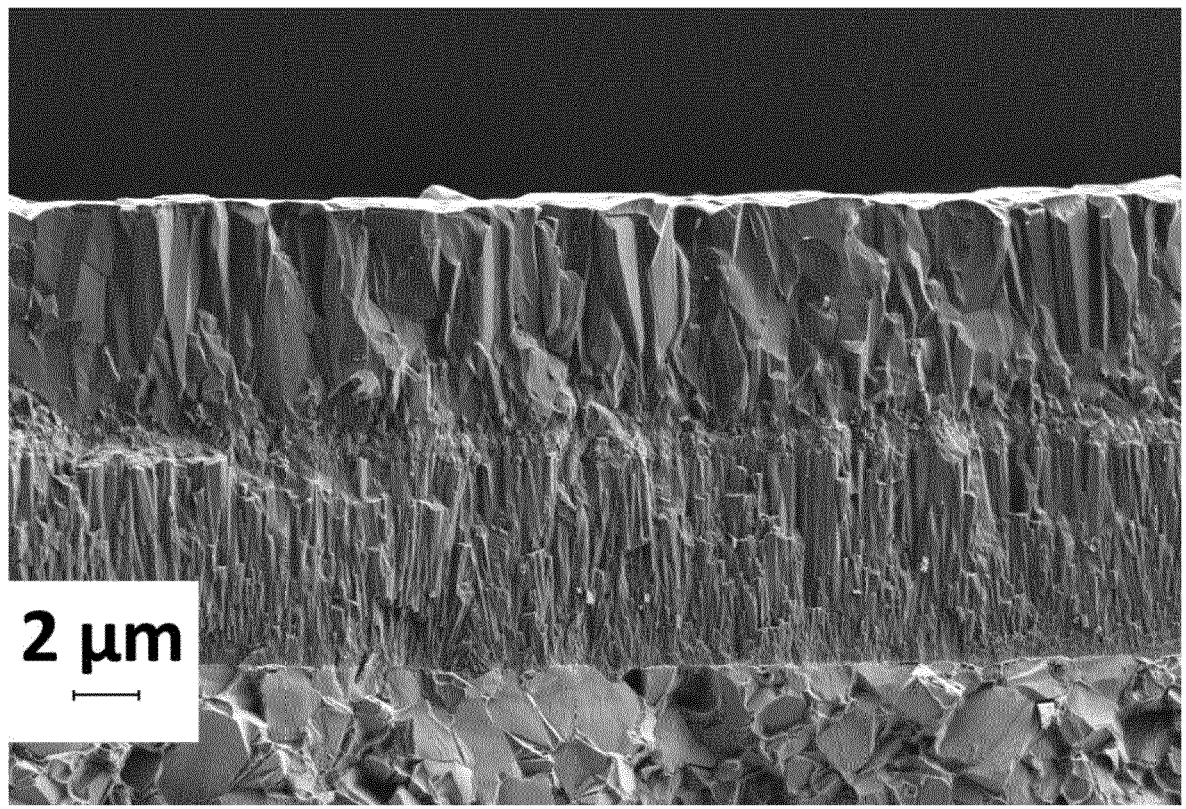
FIG. 4 is a SEM micrograph of a fractured cross-section of the rake face of the coated cutting insert shown in FIG. 1.
Figure 5:
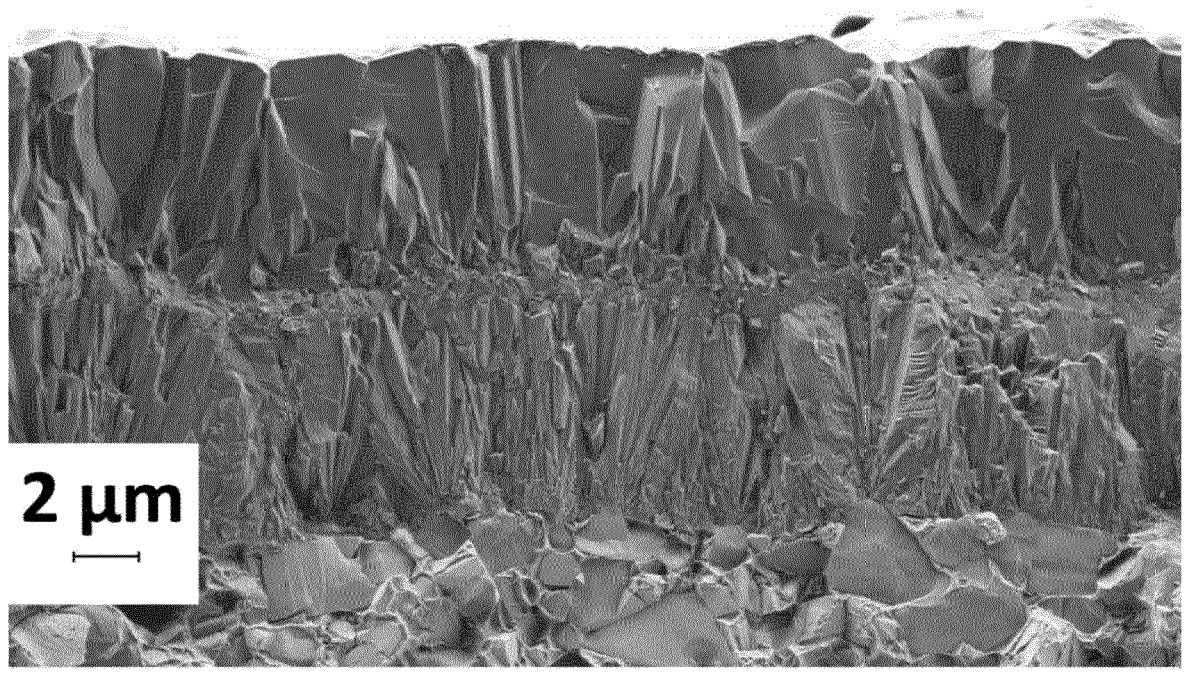
FIG. 5 is a SEM micrograph of a fractured cross-section of the flank face of the coated cutting insert shown in FIG. 1.

A fractured cross-section, exemplified in FIGS. 4 and 5 images was collected on a coated insert using a Zeiss Ultra scanning electron microscope, equipped with InLens and SE2 detectors, operating at 2 kV at working distances between 3 and 4 mm at 10000 magnification, creating images, about 35 µm by 27 µm, of the interface of the cross-section between the substrate and the coating. After identification of the interface the image was digitalized using the Digitizer tool in Origin 2018b (b9.5.5.409) by OriginLab and an $R_a$ value was calculated as follows:

The image was imported using the Origin tool Digitizer.

Axes were defined in accordance with the scale in the image.

Individual points on the interface between substrate and coating were collected at about 0.5 µm average interval, shorter intervals for curved and longer intervals for straighter features, thus creating a surface roughness profile.

A linear least-squares were fitted to the obtained profile.

The obtained linear least-squares line was subtracted from the individual data points on the profile, ensuring that eventual image rotation would not affect the evaluation.

An $R_a$ value was calculated using the formula $$R_a = \frac{1}{n}\sum_{i=1}^{n}|y_i|$$

were n=number of points used on the profile and $y_i$ is the distance, in µm, between the point i and the least-squares line.

Surface Roughness in Profilometer

For investigation of the area surface roughness of the substrate before coating a 3D optical surface profilometer, Infinite Focus XL 200-G5, from Alicona. The surface roughness measurements in Infinite Focus XL are conducted in accordance with ISO 25178. For the measurements the 100× objective was used with a vertical resolution set to 10 nm and the lateral resolution set to 1 µm. The surface roughness values, $S_a$ and $S_{10z}$, were calculated from a 450×450 µm² area; the selected area, on the polished rake face and sintered flank face of the substrate by using Gaussian filter for inclined planar surfaces and a cut off wavelength set to 90 µm. The entire 450×450 µm² analysis area was used in the surface roughness and bearing analysis by using default settings of the software. From the bearing analysis, bearing curves were produced and the following two parameters evaluated:

The $S_a$ value is the average height of the absolute values from a mean plane within the selected area (A) according to equation 2:

$$Sa = \frac{1}{A}\int\int_A |z(x,y)|dxdy \qquad (2)$$

The $S_z$ value is the sum of the maximum peak height value and the maximum valley depth within the selected area (A).

The $S_{10z}$ value is the average of the five maximum peak heights ($S_{pi}$) and the five maximum valley depths ($S_{vi}$) within the selected area (A) according to equation 3

$$S_{10z} = \frac{\sum_{i=1}^{5}(S_{pi}) + \sum_{i=1}^{5}(S_{vi})}{5} \qquad (3)$$

$S_{pk}$, Reduced peak height, i.e. the mean height of the peaks above the core material.

$S_k$, Core roughness depth, i.e. height of the core material.

Grain Size

The grain size of columnar grains, i.e. the diameter of the columns, has been determined at 80% of the layer thickness with the average grain intercept method.

Cutting Insert and Area Used for Characterization

FIG. 1 is a cross-section of a corner region of the coated cutting tool according to an embodiment of the invention. The cutting tool comprises a substrate 1 coated with an $\alpha$-$Al_2O_3$-layer 2 and an MTCVD TiCN-layer 3 arranged between the substrate and the $\alpha$-$Al_2O_3$-layer. The cutting tool insert comprises a rake face 4, a flank face 5 (formed by adjacent flank faces), and an edge region between the flank face 5 and the rake face 4, said edge region defining a cutting edge.

When the cutting tool insert is regarded in a cross section in accordance with FIG. 1, the cutting edge region is intersected by an edge line 6 and defines a cutting edge sector that defines an cutting edge radius, $r_e$, and extends on one side of the edge line 6 from said edge line 6 to a first intersection line 7 between the edge sector and the rake face 4 and on the other side of the edge line 6 from said edge line 6 to a second intersection line 8 between the edge sector and the flank face 5. The first intersection line 7 is where the tangent of the edge sector coincides with the tangent of the rake face 4, and the second intersection line 8 is where the tangent of the edge sector coincides with the tangent of the flank face 5.

Surface roughness, grain size and XRD are measured in an area $S_r$ on the rake face and in an area $S_f$ on the flank face. The area $S_r$ has a size of 1.1×1.1 mm² and is located at the nose of the rake face. The area $S_r$ extends perpendicular from the outer surface on the rake face of the coated cutting tool insert through the coating and substrate surface into the substrate, and the area $S_r$ begins at a distance about 0.4 mm from the first intersection line 7. The area $S_f$ has a size of 1.1×1.1 mm² and is located at the nose of the flank face. The area $S_f$ extends perpendicular from the outer surface on the flank face of the coated cutting tool insert through the coating and substrate surface into the substrate, and the area begins at a distance about 0.4 mm from the second intersection line 8. FIG. 1 shows a cross section taken through areas $S_r$ and $S_f$ and which would be suitable for measuring the surface roughness, $R_a$, of the surface of the substrate from a SEM image.

DETAILED DESCRIPTION

In the following, the coated cutting tool and method according to the present disclosure will be described more in detail by way of non-limiting examples.

EXAMPLES

Example 1 (Invention)

A first type of cemented carbide substrates, X, of ISO-type CNMG120408-M3 for turning was manufactured and having the composition of 5.5 wt-% Co, 2.0 wt-% Ti, 3.4 wt-% Ta, 2.0 wt-% Nb and balance WC. The substrate comprises a Co enriched surface zone essentially free from cubic carbides, the depth of the zone being about 17 µm from the substrate surface and into the body. Also, a second type of cemented carbide substrate, Y, of ISO-type CNMG120408-M3 and CNMA120408, was manufactured and having the composition of 9.0 wt-% Co, 2.0 wt-% Ti, 3.4 wt-% Ta, 2.0 wt-% Nb and balance WC. The substrates comprise a Co enriched surface zone essentially free from cubic carbides, the depth of the zone being about 20 µm from the substrate surface and into the body.

One sample M of substrates X and one sample M-Y of substrate Y were polished on the rake face using a wet brushing process. The equipment used is of model Sinjet IBX12 with a setup consisting of two operations, where the first operation performs a coarse polishing and edge preparation using a brush with a flat SiC 240K grain size bristle. The second operation performs the fine polishing and the brush is a Diamond 1000K bristle. The polishing was performed until a surface roughness, as measured with profilometer according to above description, of 0.05 µm<$R_a$<0.18 µm was achieved in the area $S_r$ as defined above.

The inserts were first coated with a thin approximately 0.4 µm TiN-layer then with an approximately 9 µm TiCN layer by employing the well-known MTCVD technique using TiCl$_4$, CH$_3$CN, N$_2$, HCl and H$_2$ at 860° C. The volume ratio of TiCl$_4$/CH$_3$CN in an initial part of the MTCVD deposition of the TiCN layer was 9, followed by a period using a ratio of TiCl$_4$/CH$_3$CN of 2.5. The details of the TiN and the TiCN deposition are shown in Table 1.

TABLE 1

| MTCVD of TiN and TiCN | | | | | | |
|---|---|---|---|---|---|---|
| MT CVD of TiN and TiCN (860° C.): | Pressure [mbar] | H$_2$ [vol %] | N$_2$ [vol %] | HCl [vol %] | TiCl$_4$ [vol %] | CH$_3$CN [vol %] |
| TiN | 600 | 69.2 | 27.7 | 1.4 | 1.7 | — |
| TiCN inner | 60 | 79.9 | 17.9 | — | 1.9 | 0.2 |
| TiCN outer | 60 | 74.8 | 20.8 | 2.5 | 1.4 | 0.5 |

On top of the MTCVD TiCN layer was a 0.5-2 µm thick bonding layer deposited at 1000° C. by a process consisting of four separate reaction steps. First a HTCVD TiN-1 step using TiCl$_4$, N$_2$, HCl and H$_2$ at 400 mbar, then a second step (TiCNO-1) using TiCl$_4$, HCl, CH$_3$CN, CO, N$_2$ and H$_2$ at 60 mbar, then a third step (TiCNO-2) using TiCl$_4$, CH$_3$CN, CO, N$_2$ and H$_2$ at 60 mbar and finally a fourth step (TiN-2) using TiCl$_4$, N$_2$ and H$_2$ at 60 mbar. During the third deposition step some of the gases were continuously changed as indicated by a first start level and a second stop level presented in Table 2. Prior to the start of the subsequent α-Al$_2$O$_3$ nucleation, the bonding layer was oxidized for 4 minutes in a mixture of CO$_2$, CO, N$_2$ and H$_2$. The details of the bonding layer deposition are shown in Table 2.

TABLE 2

| Bonding layer deposition | | | | | | | | |
|---|---|---|---|---|---|---|---|---|
| Bonding layer (1000° C.): | Pressure [mbar] | H$_2$ [vol %] | N$_2$ [vol %] | HCl [vol %] | CO [vol %] | TiCl$_4$ [vol %] | CH$_3$CN [vol %] | CO$_2$ [vol %] |
| HTCVD TiN-1 | 400 | 70.3 | 26.4 | 1.8 | — | 1.6 | — | — |
| TiCNO-1 | 60 | 83.4 | 11.9 | 1.2 | 1.2 | 1.9 | 0.4 | — |
| TiCNO-2 | 60 | 59.9-58.0 | 34.3-33.1 | — | 1.7-5.0 | 3.4-3.2 | 0.7-0.7 | — |
| TiN-2 | 60 | 61.5 | 35.1 | — | — | 3.4 | — | — |
| Oxidation | 60 | 54.3 | 29.6 | — | 12.4 | — | — | 3.7 |

An α-Al$_2$O$_3$ layer was deposited on top of the bonding layer. The two first α-Al$_2$O$_3$ steps were deposited at 1000° C. and 60 mbar and the third step at 1000° C. and 150 mbar. The first step (Al$_2$O$_3$-1) giving about 0.1 µm α-Al$_2$O$_3$, the second step (Al$_2$O$_3$-2) giving a total α-Al$_2$O$_3$ layer thickness of about 7 µm and the third step (Al$_2$O$_3$-3) giving about 0.3 µm, see Table 3.

TABLE 3

| α-Al$_2$O$_3$ deposition steps | | | | |
|---|---|---|---|---|
| α-Al$_2$O$_3$ deposition steps (balance H$_2$): | HCl [vol %] | CO$_2$ [vol %] | H$_2$S [vol %] | AlCl$_3$ [vol %] |
| Al$_2$O$_3$-1 | 1.3 | 2.4 | — | 1.4 |
| Al$_2$O$_3$-2 | 2.1 | 4.7 | 0.59 | 1.4 |
| Al$_2$O$_3$-3 | 1.5 | 5.1 | 0.06 | 1.4 |

After coating the inserts were subject to conventional wet-blasting.

Example 2 (Reference)

One sample A of substrates X and one sample K of substrate Y were untreated on both the rake and flank face and coated according to coating process in Example 1. The coated inserts were subject to conventional wet-blasting.

Example 3 (Reference)

One sample B of substrates X and one sample L of substrate Y were polished on the flank face using a wet brushing process. The polishing was performed until a surface roughness, as measured with profilometer according to above description, of 0.05 µm<$R_a$<0.18 µm was achieved in the area $S_f$ as defined above. The rake face of sample B and the rake face of sample L were left in a sintered state. Sample B and sample L were coated according to the process in Example 1. After coating the inserts were subject to conventional wet-blasting.

Example 4—Surface Analysis

Example 4a—Surface Roughness from SEM Images

SEM images were collected from fractured cross-sections from three CNMA120408 inserts, sample M, with polished rake faces and sintered flank faces, giving one image from the flank and rake face respectively from each insert. Each SEM image was evaluated using the description above, resulting in the $R_a$ values shown in Table 4.

TABLE 4

Ra values, in µm, for three inserts, sample M, polished on the rake faces and coated according to the Example 1.

|   | Flank | Rake  |
|---|-------|-------|
| 1 | 0.248 | 0.070 |
| 2 | 0.262 | 0.112 |
| 3 | 0.277 | 0.123 |

Example 4b—Surface Roughness from Surface Profilometer

The surface topography of the polished rake face and the sintered flank face for the substrate of samples K, L and M were investigated using a 3D optical surface profilometer according to the description above and in area $S_r$ on the rake face and area $S_f$ on the flank face as described above. The $S_a$ is 0.16 µm for the rake face and 0.33 µm for the flank face for sample M. The $S_{10z}$-value is 2.1 µm for the rake face and 5.0 µm for the flank face for sample M. Also, the $R_a$ values, in µm for the flank faces were measured with the optical surface profilometer in area $S_f$ on the flank face. As can be seen from the $R_a$-value, 0.25 µm, measured in area $S_f$ on sample "M-flank" with profilometer on the as-sintered substrate surface it corresponds with the average of the three $R_a$-values, 0.26 µm, measured on a SEM image of sample "M-flank", i.e. a SEM image of a cross-section of the cutting insert through areas $S_f$ and $S_r$. For evaluating the surface roughness $R_a$ of the substrate of a coated cutting tool the above described method using a SEM images taken from polished or fractured cross-sections is used.

TABLE 5

Surface analysis

| Sample    | Ra (µm) | Sa (µm) | S10z (µm) | Sk (µm) | Spk (µm) |
|-----------|---------|---------|-----------|---------|----------|
| K - rake  |         | 0.326   | 3.432     | 1.066   | 0.369    |
| L - rake  |         | 0.322   | 2.939     | 1.064   | 0.353    |
| M - rake  |         | 0.161   | 2.121     | 0.436   | 0.102    |
| K - flank | 0.257   | 0.333   | 8.662     | 1.075   | 0.463    |
| L - flank | 0.102   | 0.133   | 1.559     | 0.333   | 0.069    |
| M - flank | 0.248   | 0.330   | 5.023     | 1.045   | 0.493    |

Example 5—Texture Analysis

The cutting tools in examples 1, 2 and 3 comprises a substrate coated with a coating comprising a layer of TiCN and α-$Al_2O_3$ corundum, wherein the layers exhibit texture coefficients TC(hkl), as measured by X-ray diffraction, XRD, using CuKα radiation and θ-2θ scan, defined according to Harris formula $$TC(hkl) = \frac{I(hkl)}{I_0(hkl)} \left[ \frac{1}{n} \sum_{n=1}^{n} \frac{I(hkl)}{I_0(hkl)} \right]^{-1} \quad (1)$$

where I(hkl) is the measured intensity (integrated area) of the (hkl) reflection, $I_0$(hkl) is the reference intensity, n is the number of reflections used in the calculation, and where the (hkl) reflections used are (1 0 4), (1 1 0), (1 1 3), (0 2 4), (1 1 6), (0 1 8), (3 0 0), (0 2 10), (0 0 12) and (0 1 14) in the case of α-$Al_2O_3$ and (1 1 1), (2 0 0), (2 2 0), (3 1 1), (3 3 1), (4 2 0), (4 2 2) and (5 1 1) in the case of TiCN.

XRD was used to analyse the TC values, see Table 6 and 7, of the α-$Al_2O_3$ and the TiCN layers in accordance with the method as disclosed above. Table 6 shows TC(hkl) for the α-$Al_2O_3$ layer for the polished rake and sintered flank surfaces for five different CNMA120408 cutting tools of sample M, coated according to example 1. Table 7 shows TC(hkl) for the TiCN layer for the polished rake and sintered flank surfaces for five different CNMA120408 cutting tools of sample M coated according to example 1.

TABLE 6

TC(hkl) for the α-$Al_2O_3$ layer for the polished rake and sintered flank surfaces according to example 1.

|      |   | (104) | (110) | (113) | (024) | (116) | (018) | (030) | (0210) | (0012) | (0114) |
|------|---|-------|-------|-------|-------|-------|-------|-------|--------|--------|--------|
| Rake | 1 | 0.01  | 0.01  | 0.00  | 0.01  | 0.02  | 0.13  | 0.00  | 0.24   | 8.64   | 0.94   |
|      | 2 | 0.01  | 0.01  | 0.00  | 0.01  | 0.02  | 0.09  | 0.00  | 0.18   | 8.88   | 0.80   |
|      | 3 | 0.00  | 0.01  | 0.00  | 0.01  | 0.01  | 0.09  | 0.00  | 0.21   | 8.89   | 0.78   |
|      | 4 | 0.00  | 0.01  | 0.00  | 0.01  | 0.01  | 0.10  | 0.00  | 0.15   | 8.85   | 0.86   |
|      | 5 | 0.00  | 0.01  | 0.00  | 0.01  | 0.01  | 0.04  | 0.00  | 0.10   | 9.33   | 0.50   |

TABLE 6-continued

TC(hkl) for the α-Al₂O₃ layer for the polished rake and sintered flank surfaces according to example 1.

|  |  | (104) | (110) | (113) | (024) | (116) | (018) | (030) | (0210) | (0012) | (0114) |
|---|---|---|---|---|---|---|---|---|---|---|---|
| Flank | 1 | 0.02 | 0.01 | 0.01 | 0.02 | 0.04 | 0.52 | 0.02 | 0.29 | 6.05 | 3.02 |
|  | 2 | 0.02 | 0.01 | 0.01 | 0.02 | 0.05 | 0.58 | 0.02 | 0.33 | 5.93 | 3.04 |
|  | 3 | 0.02 | 0.01 | 0.01 | 0.02 | 0.04 | 0.53 | 0.01 | 0.29 | 6.27 | 2.80 |
|  | 4 | 0.02 | 0.01 | 0.01 | 0.02 | 0.04 | 0.55 | 0.01 | 0.43 | 6.01 | 2.91 |
|  | 5 | 0.02 | 0.01 | 0.01 | 0.02 | 0.04 | 0.52 | 0.01 | 0.31 | 5.98 | 3.08 |

TABLE 7

TC(hkl) for the TiCN layer for the polished rake and sintered flank surfaces cutting tools coated according to example 1.

|  |  | (111) | (200) | (220) | (311) | (331) | (420) | (422) | (511) |
|---|---|---|---|---|---|---|---|---|---|
| Rake | 1 | 0.04 | 0.02 | 0.21 | 1.12 | 0.33 | 0.27 | 5.91 | 0.09 |
|  | 2 | 0.04 | 0.02 | 0.22 | 1.01 | 0.20 | 0.30 | 5.97 | 0.24 |
|  | 3 | 0.03 | 0.02 | 0.18 | 0.98 | 0.10 | 0.19 | 6.24 | 0.26 |
|  | 4 | 0.02 | 0.02 | 0.18 | 0.89 | 0.26 | 0.21 | 6.33 | 0.09 |
|  | 5 | 0.03 | 0.02 | 0.19 | 0.86 | 0.19 | 0.25 | 6.41 | 0.05 |
| Flank | 1 | 0.27 | 0.07 | 0.61 | 0.71 | 1.80 | 1.22 | 2.45 | 0.87 |
|  | 2 | 0.29 | 0.07 | 0.66 | 0.54 | 1.78 | 1.21 | 2.42 | 1.04 |
|  | 3 | 0.29 | 0.07 | 0.66 | 0.51 | 1.86 | 1.24 | 2.44 | 0.94 |
|  | 4 | 0.29 | 0.07 | 0.64 | 0.94 | 1.47 | 1.13 | 2.61 | 0.84 |
|  | 5 | 0.30 | 0.07 | 0.59 | 0.96 | 1.71 | 1.20 | 2.35 | 0.82 |

Figure 2:
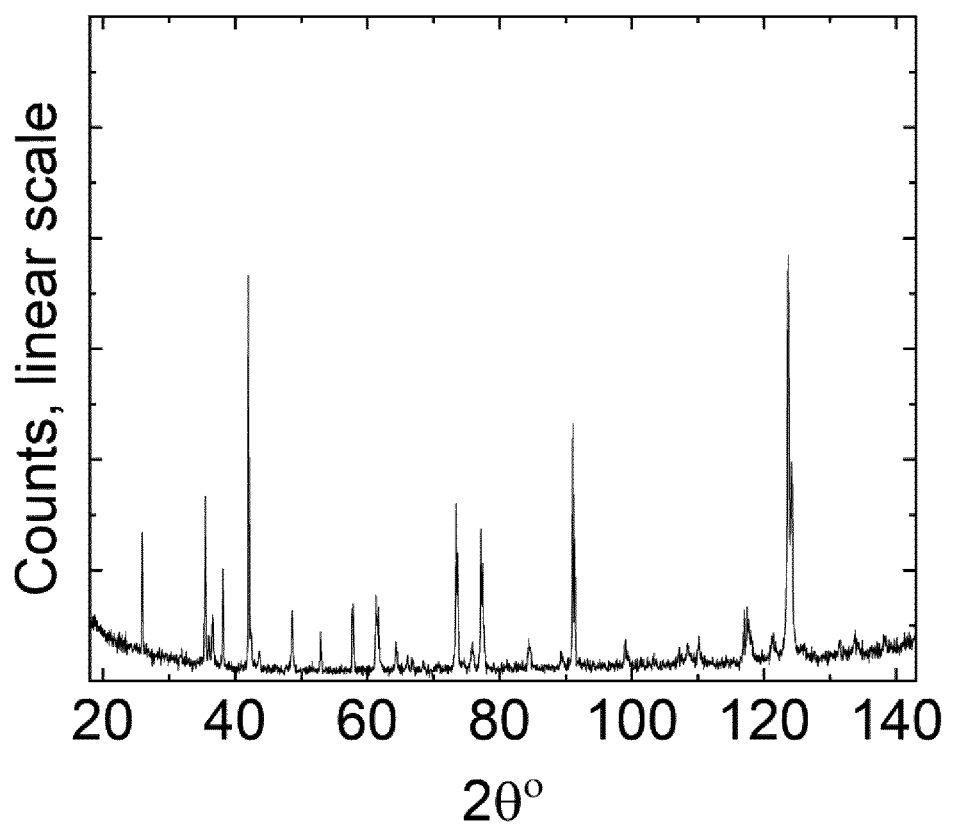
FIG. 2 is an X-Ray θ-2θ diffractogram of a coating on the rake face of the cutting tool insert shown in FIG. 1.
Figure 3:
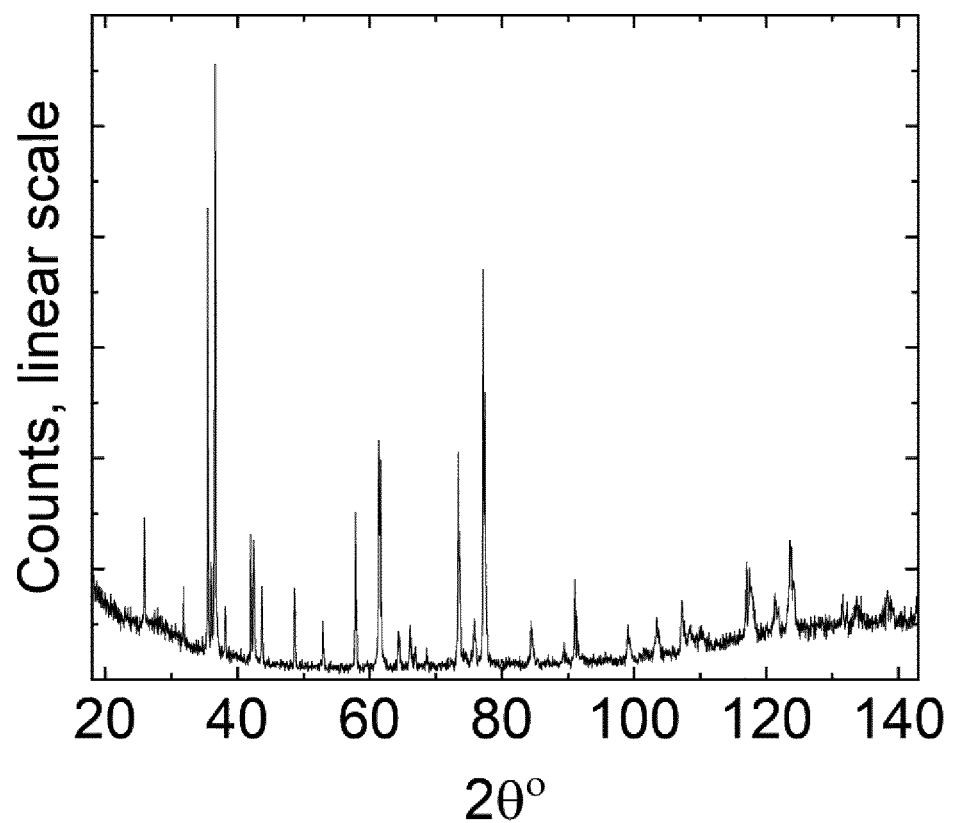
FIG. 3 is an X-ray θ-2θ diffractogram of a coating on the flank face of the cutting tool insert shown in FIG. 1.

FIG. 2 shows an X-ray diffraction pattern from the polished rake face of a CNMG120408 cutting tool according to table 6. Notable features are the α-Al₂O₃(0 0 12) peak at about 91° and the Ti(C,N) (4 2 2) peak at 124°. FIG. 3 shows an X-ray diffraction pattern from the sintered flank face of a CNMG120408 cutting tool according to table 7. Notable features are the α-Al₂O₃ (0 0 12) peak at about 91° and the Ti(C,N) (4 2 2) peak at 124°.

Example 6—Grain Size

FIG. 4 is a Scanning electron microscope (Zeiss Ultra operated at 2 kV, work distance 3.7 mm) image of a fracture cross-section of a coated CNMA120408 sample M showing the polished rake face with the MT-TiCN and α-Al₂O₃ layers. It can be seen that the MT-TiCN morphology is fine grained and columnar and that the α-Al₂O₃ layer exhibits a high texture with columnar grains.

FIG. 5 is a Scanning electron microscope (Zeiss Ultra operated at 2 kV, work distance 3.7 mm) image of a fracture cross-section of a coated CNMA120408 sample M showing the sintered flank face with the MT-TiCN and α-Al₂O₃ layers. The MT-TiCN layers in FIG. 5 exhibit a columnar grain structure but the structure of the MT-TiCN layer in FIG. 4 is coarser grained than in FIG. 3. The α-Al₂O₃ layer in FIG. 4 has a lower texture than the α-Al₂O₃ layer on the rake face as shown in FIG. 3.

From FIG. 4 the grain size of the columnar TiCN, i.e. the diameter of the columns, has been determined at 80% of the layer thickness with the average grain intercept method. The average grain size of the TiCN on the rake face in area $S_r$ was 0.39 μm.

Variants for Cutting Tests

TABLE 8

| Variant | Substrate | Coating | Rake face | Flank face |
|---|---|---|---|---|
| A (Reference) | X | According to Example 1 | As sintered | As sintered |
| B ((Reference) | X | According to Example 1 | As sintered | Polished |
| F | X | According to Example 1 | Polished | As sintered |
| K (Reference) | Y | According to Example 1 | As sintered | As sintered |
| L (Reference) | Y | According to Example 1 | As sintered | Polished |
| M | Y | According to Example 1 | Polished | As sintered |

Cutting Test 1

The coated cutting tools of the ISO type CNMG120408, substrate Y, i.e. variants K, M and L as coated and blasted, were tested in an alternating longitudinal/facing turning operation in general construction steel (C45E) using the following cutting data;

Cutting speed $v_c$: 350 m/min

Cutting feed, f: 0.35 mm/revolution

Depth of cut, $a_p$: 3 mm

Time in cut: 2 min 40 s

The machining was performed dry.

One cutting edge per cutting tool was evaluated. All edges in all variants were run in identical time and manner and then compared using a light optical microscope and ranked with respect to visible flaking of alumina on the clearance side in the nose section of the inserts below the area of contact with the work piece material.

TABLE 9

Resistance to alumina flaking

| Variant | Ranking after 2 min 40 s (Lower digit = better resistance to alumina flaking) |
|---|---|
| K | 1 |
| M | 1 |
| L | 2 |

Cutting Test 2

The coated cutting tools of the ISO type CNMG120408, substrate X, i.e. A, B and F as coated and blasted, were tested in a longitudinal turning operation in steel, 42CrMo4 in annealed condition, using the following cutting data;

Cutting speed $v_c$: 270 m/min
Cutting feed, f: 0.3 mm/revolution
Depth of cut, $a_p$: 2 mm
Start diameter: 158 mm
Finish diameter: 50 mm
Length of cut: 47 mm
Time in cut: 40 min
The machining was performed dry.

One cutting edge per cutting tool was evaluated. All edges in all variants were run in identical time and manner and then compared using a light optical microscope and ranked with respect to extent of crater wear. More crater wear=less crater wear resistance.

TABLE 10

Resistance to crater wear

| Variant | Ranking after 40 [min] (Lower digit = better resistance to crater wear) |
|---|---|
| F | 1 |
| B | 2 |
| A | 2 |

It is estimated from the wear comparison that the variant having the polished rake face and as sintered clearance face would have a 25% longer tool life due to better crater wear resistance.

Even though this invention has been illustrated and described in accordance with some preferred embodiments, it is recognized that variations and changes may be made therein without departing from the invention as defined in the claims. For example, the flank face could be exposed to a treatment for increasing the surface roughness, such as laser treatment or grinding.

The invention claimed is:

1. A coated cutting tool comprising:
a rake face;
a flank face;
a cutting edge region between and adjoining the flank face and the rake face in a nose area of a cutting tool insert, the cutting edge region being intersected by an edge line and defining a cutting edge sector that defines a cutting edge radius, $r_e$; and
a substrate with a coating having a thickness between 1 μm and 40 μm, where the coating includes an α-$Al_2O_3$ layer and an MTCVD TiCN layer located between the substrate and the α-$Al_2O_3$ layer, wherein the α-$Al_2O_3$ layer exhibits a texture coefficient TC(hkl), as measured by X-ray diffraction using CuKa radiation and θ-2θ scan, defined according to Harris formula $$TC(hkl) = \frac{I(hkl)}{I_0(hkl)} \left[ \frac{1}{n} \sum_{n=1}^{n} \frac{I(hkl)}{I_0(hkl)} \right]^{-1}$$

where I(hkl) is the measured integrated area intensity of the (hkl) reflection with corresponding reference intensity $I_0$(hkl), n is the number of reflections used in the calculation, the (hkl) reflections used are (1 0 4), (1 1 0), (1 1 3), (0 2 4), (1 1 6), (0 1 8), (3 0 0), (0 2 10), (0 0 12) and (0 1 14) and their corresponding reference intensities used are $I_0$(1 0 4)=10000, $I_0$(1 1 0)=4686, $I_0$(1 1 3)=9734, $I_0$(0 2 4)=4903, $I_0$(1 1 6)=9562, $I_0$(0 1 8)=724, $I_0$(3 0 0)=5632, $I_0$(0 2 10)=728, $I_0$(0 0 12)=168 and $I_0$(0 1 14)=448, wherein the surface roughness, $R_a$, of the substrate on the flank face is $R_a \geq 0.24$ μm, as measured from a SEM image taken from a cross section in an area $S_f$ of 1.1×1.1 mm² at the nose of the flank face where said area $S_f$ begins at a distance about 0.4 mm from the cutting edge region, the surface roughness of the substrate on the rake face is 0.05 μm<$R_a$<0.18 μm, as measured from a SEM image taken from a cross section in an area $S_r$ of 1.1×1.1 mm² at the nose of the rake face where said area $S_r$ begins at a distance about 0.4 mm from the cutting edge region, the MTCVD TiCN layer exhibits a texture coefficient TC(hkl), as measured by X-ray diffraction using CuKa radiation and θ-2θ scan, defined according to Harris formula where I(hkl) is the measured integrated area intensity of the (hkl) reflection with corresponding reference intensity $I_0$(hkl), n is the number of reflections used in the calculation, the (hkl) reflections used are (1 1 1), (2 0 0), (2 2 0), (3 1 1), (3 3 1), (4 2 0), (4 2 2) and (5 1 1), and their corresponding reference intensities used are: $I_0$(1 1 1)=7871, $I_0$(2 0 0)=10000, $I_0$(2 2 0)=5369, $I_0$(3 1 1)=2550, $I_0$(3 3 1)=1128, $I_0$(4 2 0)=2366, $I_0$(4 2 2)=2479, and $I_0$(5 1 1)=1427, wherein TC(4 2 2) is ≥5.5 on the rake face as measured in area $S_r$, wherein the α-$Al_2O_3$ layer exhibits a texture coefficient TC(0 0 12)≥8.5 on the rake face as measured in area Sr, and wherein the MTCVD TiCN layer on the flank face exhibits a TC(4 2 2)<3.5.

2. The coated cutting tool according to claim 1, wherein the MTCVD TiCN layer on the rake face exhibits a TC(4 2 2)≥6.0.

3. The coated cutting tool according to claim 1, wherein the MTCVD TiCN layer on the flank face exhibits a TC(4 2 2)≤3.0.

4. The coated cutting tool according to claim 1, wherein TC(4 2 2) of the MTCVD TiCN layer on the rake face is at least two times TC(4 2 2) of the TiCN layer on the flank face.

5. The coated cutting tool according to claim 1, wherein the α-$Al_2O_3$ layer exhibits a texture coefficient TC(0 0 12)≥9 on the rake face.

6. The coated cutting tool according to claim 1, wherein a thickness of the α-$Al_2O_3$ layer is 1.5-20 μm.

7. The coated cutting tool to claim 1, wherein the thickness of said MTCVD TiCN layer is 1.5-20 μm.

8. The coated cutting tool according to claim 1, wherein a surface roughness, Ra, of the substrate as measured in area $S_r$ on the rake face is less than 70% of the surface roughness, Ra, of the substrate as measured in area $S_f$ on the flank face.

9. The coated cutting tool according to claim 1, wherein the surface roughness of the substrate as measured in area $S_r$ on the rake face is 0.05 μm<$R_a$<0.15 μm.

10. The coated cutting tool according to claim 1, wherein the surface roughness of the substrate as measured in area $S_r$ on the rake face is 0.10 μm<Ra<0.18 μm.

11. The coated cutting tool according to claim 1, wherein the average grain size of the TiCN layer as measured on the rake face is between 0.3 and 0.5 μm as measured with the intercept method at 80% of the layer thickness.

12. The coated cutting tool according to claim 1, wherein the substrate is made of any of the following: cemented carbide, cermet and ceramic.

\* \* \* \* \*